United States Patent [19]
Morihara et al.

[11] Patent Number: 5,563,803
[45] Date of Patent: Oct. 8, 1996

[54] FLUIDIZED-BED EQUIPMENT AND PRESSURIZED FLUIDIZED-BED (COMBUSTION) COMBINED CYCLE APPARATUS

[75] Inventors: Atsushi Morihara, Katsuta; Naoyuki Nagafuchi, Hitachi; Jinichi Tomuro, Katsuta, all of Japan

[73] Assignee: Hitachi, Ltd., Tokyo, Japan

[21] Appl. No.: 35,118

[22] Filed: Mar. 19, 1993

[30] Foreign Application Priority Data

Mar. 19, 1992 [JP] Japan ................... 4-063140

[51] Int. Cl.⁶ ................................. G01N 13/00
[52] U.S. Cl. ............ 364/496; 364/555; 364/509; 364/562; 209/473; 209/483; 209/485; 34/249
[58] Field of Search ...................... 364/496, 554, 364/509, 562, 567, 555; 422/139, 141, 140, 143–145, 147; 48/203, DIG. 10, 128, 198.6, 200–202, 197 R, DIG. 1, 4–6, 206, 210; 324/227, 464, 635; 73/19.1, 23.25, 23.36, 23.4, 24.03, 24.04, 28.04, 28.06, 64.56, 65.01, 433, 434, 447, 53.06, 53.07, 54.14, 64.55, 290 R, 291, 292, 304 R, 304 C, 314; 118/DIG. 5; 95/108, 27, 28; 96/150.2; 210/792; 209/458, 477, 471, 485, 483, 473, 474, 465, 40; 208/127, 146–149, 153, 108, 161, 163–165; 34/3.64, 249; 148/630; 432/15; 204/302, 306, 308; 165/104.16; 423/DIG. 5, 6, 16, 150.6, 659; 427/182, 185, 213; 374/137, 143, 123, 124

[56] References Cited

U.S. PATENT DOCUMENTS

| 4,421,523 | 12/1983 | Mehta et al. ............... 48/DIG. 10 |
| 5,043,912 | 8/1991 | Reus ............................ 364/509 |
| 5,139,412 | 8/1992 | Kychakoff et al. ............ 374/124 |
| 5,250,273 | 10/1993 | Hornsey et al. ................ 423/3 |

FOREIGN PATENT DOCUMENTS

| 0041094 | 9/1981 | European Pat. Off. . |
| 3433302 | 9/1984 | Germany . |
| 3721476 | 6/1987 | Germany . |
| 4308694 | 3/1993 | Germany . |
| 59-41705 | 3/1984 | Japan . |
| 60-193330 | 10/1985 | Japan . |
| 60-195420 | 10/1985 | Japan . |
| 62-102121 | 5/1987 | Japan . |
| 1102395 | 4/1989 | Japan . |

OTHER PUBLICATIONS

Chen et al., Moving–Bed Solids Flow in an Inclined Pipe Leading Into a Fluidized Bed, AICHE Journal, vol. 26, No. 1, Jan. 1980 pp. 24–30.

Rojo et al., A Capacitor Model to Interpret the Electric Behaviour of Fluidized Beds at Influence of Apparatus Geometry, Chemical Engineering Science, vol. 41, No. 8 pp. 2171–2181, 1986.

Fuchs et al., An Automated Monitoring System for an Experimental Coal Gasifier, Chemical Instrumentation, 1973–1974 vol. 5, No. 3 pp. 155–177.

Primary Examiner—James P. Trammell
Assistant Examiner—Hal D. Wachsman
Attorney, Agent, or Firm—Antonelli, Terry, Stout & Kraus

[57] ABSTRACT

A bed height of a fluidized bed is detected which influences reaction of a fluidized-bed equipment. In the fluidized-bed equipment in which a fluidized particle is put into the vessel, physical properties at a plurality of points within the vessel are measured in a height direction thereof. An interior of the vessel is divided into upper and lower two regions. Physical property distribution curves of the respective regions are found, to find an intersection between the two curves as a bed height. Thus, it is possible to find the bed height of the fluidized bed which influences the reaction of the fluidized-bed equipment. An operating quantity which influences the reaction can be adjusted or regulated accurately.

7 Claims, 7 Drawing Sheets

FLUIDIZED-BED EQUIPMENT AND PRESSURIZED FLUIDIZED-BED (COMBUSTION) COMBINED CYCLE APPARATUS

BACKGROUND OF THE INVENTION

1. Field of the Invention

The present invention relates to a fluidized-bed equipment formed, in a vessel, with a plurality of regions including a first region high in concentration of a granular or liquid fluidized substance and a second region low in the concentration, to effect various treatments or processings such as combustion, gasification and the like. Further, the invention relates to a pressurized fluidized-bed (combustion) combined cycle apparatus in which coal is burned and gasified within a vessel filled with a fluidized particle, and steam is produced from water by combustion heat, to drive a steam turbine and to drive a gas turbine by exhaust gas.

The invention can be applied to a fluidized-bed gasifier for supplying a coal particle and a gasification agent of coal into a vessel to gasify the coal, a fluidized-bed combustion apparatus for supplying a particle in which industrial wastes are granulated and a gasification agent by which the industrial wastes are burned, into the vessel to burn the wastes, and the like.

Moreover, the invention can also be applied to a fluidized-bed gasifier for a heavy oil, in which the heavy oil and a gasification agent for the heavy oil are supplied into a vessel to gasify the heavy oil, a bioreactor in which a biomass such as plants, chips and the like and a gasification agent for gasifying the biomass are supplied into a vessel and are gasified, and the like. Of course, the invention should not be limited to these arrangements.

2. Description of the Prior Art

It has been known to find a temperature distribution within a vessel in a height direction in order to detect a surface position of a substance put into the vessel. For example, it has been disclosed in Japanese Patent Unexamined Publication No. 59-41705 to arrange a heat transfer portion capable of heat-transferring a temperature difference between a fluidized bed (fluidized particle filled portion) of a fluidized-bed equipment and a free board portion (gas portion), to the outside, to detect a temperature distribution of the heat transfer portion to thereby measure a bed height of the fluidized bed. The prior art can effect the fact that a portion in contact with the fluidized bed and the free board portion are clearly different from each other in metal temperature at the heat transfer portion, to measure the bed height of the fluidized bed.

There are many examples for finding the temperature distribution to detect the surface, which are disclosed in, e.g., Japanese Patent Unexamined Publication No. 1-102395, Japanese Patent Unexamined Publication No. 62-102121, and Japanese Patent Unexamined Publication No. 60-195420.

In addition to the above, it has been known to detect a bed height of a pressurized fluidized-bed equipment by a pressure difference, which is disclosed in a publication.

The prior art in which the temperature distribution within the vessel in the height direction is measured to detect a surface from an abrupt change in the temperature distribution is advantageous for an arrangement in which temperatures are clearly different from each other with the surface serving as a boundary.

However, even if the prior art is applied to an arrangement like the fluidized-bed equipment in which temperatures are not almost different from each other at a boundary between the fluidized bed portion and the free board portion within the vessel, it is impossible to find the bed height.

Furthermore, in the fluidized-bed equipment, a fluidized particle is always fluidized by supply of gas. If the bed height of the fluidized-bed equipment is detected by a pressure difference, a portion deep or thick in fluidized particle is judged as being a fluidized-bed portion, and a portion thin or light in fluidized particle is judged as being a free board portion. It is likewise impossible to find the bed height even if such a prior art is applied thereto.

SUMMARY OF THE INVENTION

It is an object of the invention to provide a fluidized-bed equipment comprising a vessel formed with a first region high in concentration of a fluidized particle and a second region low in the concentration, wherein it is possible to detect a bed height of the fluidized particle which influences reaction within the vessel.

According to the invention, there is provided a fluidized-bed equipment comprising a vessel which forms a plurality of regions including a first region high in concentration of a granular or liquid substance and a second region low in the concentration, wherein surface detecting means is provided which produced a plurality of physical property distribution curves from physical property measuring values at a plurality of points within the vessel, to find an intersection of the physical property distribution curves as a surface.

The invention has been so arranged as to find out that the physical property within the vessel containing therein the fluidized particle is measured whereby there are provided two physical property distribution curves different from each other, and an intersection between the physical property distribution curves is determined as being a boundary between the fluidized-bed portion and the gas portion, whereby it is possible to accurately find a heat transfer region contributing to reaction within the vessel.

A technical idea of the invention can also be applied to a fluidized-bed equipment in which a single or a plurality of fluidized beds is or are formed within the vessel by a density difference or a specific gravity difference.

In the fluidized-bed equipment, catalytic reaction between the particle and the gasification agent put into the bed is largely affected or influenced by the bed height of the fluidized particle. The bed height of the fluidized particle is detected, and the supply quantity of the fuel, the supply quantity of the gasification agent or the like is regulated on the basis of the detected value as performed according to the invention, whereby it is possible to accurately control the reaction within the vessel. Further, an inclination of the temperature distribution of the fluidized-bed portion adjacent to the inner wall within the vessel is found, whereby there is produced such an advantage that fluidized phenomenon of the fluidized particle adjacent to the inner wall can be estimated.

Moreover, according to the invention, there is also provided a fluidized-bed equipment comprising a vessel which forms a first region high in concentration of a granular or liquid substance and a second region low in the concentration, means for measuring a physical property within the vessel and surface detecting means for dividing the vessel into upper and lower two regions, to find expressions for fitting of physical property distribution curves in respective regions from physical property measuring values contained in the regions, to thereby find an intersection of the expressions for fitting as a layer height. Here, the aforesaid two regions may be two regions determined optionally. Furthermore, in time of measurement of the physical property, it is desired that measuring means is provided within the vessel for directly measuring the physical property within the vessel.

For the method in which the heat transfer portion is formed on the vessel wall surface to find the temperature distribution as has been described in the PRIOR ART, it is impossible to find two curves different in temperature distribution from each other.

The invention may be arranged such that physical property distribution curves of optionally divided respective two regions are produced from results produced by measurement of the physical property within the vessel, to display the physical property distribution curves of the respective regions. Surface detecting means may be formed by display means for displaying the physical property distribution curves of the respective regions on the same screen.

The arrangement may be such that the interior of the vessel containing the fluidized particle is divided into upper and lower two regions, to find a function expressing the physical property distributions in the respective regions from physical property measuring points in the respective regions and a measuring value thereof, to thereby find an intersection of the two regions on the basis of the function.

Furthermore, the arrangement may also be such that the interior of the vessel is divided into upper and lower two regions, to produce two expressions for fitting expressing physical property distributions in the respective regions by a single exponential function from the physical property measuring points within the respective regions and measuring values thereof, to thereby find an intersection of the expressions for fitting.

It is the most desirable that the vessel containing the fluidized particle is divided into upper and lower optional two regions to find an intersection from expressions for fitting expressing physical property distributions in the respective regions, and that this operation is effected with respect to any combinations of the regions with the regions changed. It is desirable that a combination which is the best in correlation between the measurement value of the physical property and the expression for fitting is selected among expressions for fitting found with respect to the all regions, to bring the intersection found from the expressions of fitting to the bed height.

As the physical properties, there are temperature, pressure, density, composition of the fluidized substances within the vessel, and the like. It is desirable that one or a plurality of these physical properties is or are measured.

As means for measuring the physical property, thermocouples can be used for, example, measurement of temperature. The thermocouples may beforehand be arranged respectively at a plurality of locations within the vessel. Alternatively, a single or a plurality of thermocouples may be used to measure temperature at a plurality of points.

One of the pressurized fluidized-bed equipments according to the invention comprises a pressure vessel filled with a fluidized particle, means for supplying a coal particle into the pressure vessel, means for supplying a gasification agent of the coal particle, and means for exhausting gas of formation produced by gasification of the coal from the vessel, and further, comprises means for measuring physical properties at a plurality of points within the vessel in a height direction, and surface detecting means for dividing the vessel into upper and lower two optional regions to produce physical-property distribution curves of the respective regions from physical-property measurement values, to thereby find an intersecting point in which the two curves are intersected with each other, as a bed height.

Further, another one of the pressurized fluidized-bed equipments according to the invention comprises a pressure vessel filled with a fluidized particle, means for supplying a coal particle into the vessel, means for supplying a gasification agent of the coal particle, and means for exhausting gas of formation generated due to gasification of the coal out of the vessel, and further comprises display means for producing physical-property distribution curves of optionally divided respective upper and lower two regions of the vessel from physical-property measurement values at a plurality of points within the vessel in a height direction to display the physical-property distribution curves.

It is needless to say that the physical properties at the plurality of points within the vessel in the height direction may be so measured as to produce expressions for fitting for finding the physical-property distribution curves of the optionally divided upper and lower two regions within the vessel, to detect the intersection of the two expressions of fitting as the bed height. Moreover, it is needless to say that it is extremely desirable that these operations are effected with respect to any combinations of the regions within the vessel to detect, as the bed height, the intersections between the two expressions for fitting in combinations in which correlation between the physical-property measurement values and the expressions for fitting is the best.

The fluidized-bed gasifier according to the invention comprises means for supplying granular solid fuel into a vessel, means for supplying a gasification agent for combustion of the solid fuel, and means for exhausting gas of formation produced by combustion of the solid fuel, and further comprises surface detecting means for producing physical-property distribution curves of the optionally divided upper and lower respective two regions of the vessel on the basis of the physical-property measuring results at a plurality of points within the vessel in the height direction, to find, as a bed height, an intersection between both the curves. A coal particle or a granulated particle of industrial wastes can be supplied as the solid fuel.

According to the invention, there is provided a fluidized-bed boiler comprising a vessel filled with a fluidized particle, means for supplying a coal particle into the vessel, means for supplying a gasification agent of the coal particle, means for exhausting combustion gas produced by gasification of the coal particle, from the vessel, heat-exchanging means arranged within the vessel and for being heated by heat of combustion of the coal particle to produce steam from water, means for measuring physical properties at a plurality of points within the vessel in a height direction, means for dividing an interior of the vessel into optional upper and lower two regions to find physical property distribution curves within the respective regions to display the physical-property distribution curves, and means for regulating at least one of the fuel supply quantity, the gasification agent supply quantity, and the quantity of water supplied to the heat exchanging means, on the basis of an intersection of produced two physical property distribution curves.

Further, according to the invention, there is provided a pressurized fluidized-bed (combustion) combined cycle apparatus comprising a pressure vessel provided with a heat transfer tube filled with a fluidized particle for producing steam from water, a gas turbine driven by power which is gas generated by supply of a coal particle and a gasification agent of the coal particle to the vessel, a steam turbine driven by steam produced by the heat transfer tube, a generator for generating electric power by the power of the gas turbine, a generator for generating electric power by the power of the steam turbine, means for measuring physical properties at a plurality of points within the vessel in a height direction, to find an intersection between respective physical distributions within upper and lower two divided regions, and means for regulating at least one of a quantity of coal particles and, a flow rate of the gasification agent supplied into the pressure vessel and a quantity of water supplied to the heat transfer tube, on the basis of the produced intersection.

In such pressurized fluidized-bed (combustion) combined cycle apparatus, it is desirable that a first heat transfer tube for producing steam from water therein and a second heat transfer tube for recirculating the produced steam to produce reheat steam therein are provided within the pressure vessel, and a high-pressure steam turbine driven by the steam produced by the first heat transfer tube and a low-pressure steam turbine driven by reheat steam produced by the second heat transfer tube are provided.

According to the invention, the physical property within the vessel filled with the fluidized particle is measured at the plurality of points in the height direction, the plurality of physical-property distribution curves are produced on the basis of the measurement results to bring the intersection between the curves to the bed height of the fluidized bed. By doing so, it is possible to detect the bed height of the fluidized bed which influences the contact reaction between the fluidized particle inserted into the vessel and the gasification agent.

The distribution of the physical property is found from the results produced by direct measurement of the physical property within the vessel filled with the fluidized particle, whereby there can be produced a plurality of distribution curves. Thus, it was possible to find a bed height of the fluidized bed.

In the fluidized-bed equipment, the fluidized particle is always fluidized, and there is no clear boundary between the fluidized-bed portion and the free board portion. In order to control the contact reaction which occurs within the vessel, it is important to know the region of the fluidized bed portion which influences the reaction. It is possible to detect the region according to the invention.

Furthermore, it is possible to find the expressions for fitting of the respective physical property distributions of the optionally divided two regions from the physical-property measurement results within the vessel in the height direction, and the intersection between the expressions for fitting is produced, whereby it is possible to automatically detect the bed height. As methods of finding the intersections on the basis of the expressions of fitting, there is a method in which functions of the physical-property distribution passing through a measurement point within an optionally determined region are produced on the basis of the measuring values and the measuring points of the physical property, to find the intersection between the functions. Further, there is a method which expresses the expression for fitting for finding the physical-property distributions of the respective regions as a single exponential function.

The fluidized-bed equipment is divided into optional two regions, to produce expressions for fitting expressing the physical-property distributions of the respective regions from the physical-property measurement results, and these are effected with respect to every combinations considered, to find the intersection of the expressions for fitting which are the best in correlation between the physical-property measurement value and the expression for fitting, as the bed height, whereby it is possible to detect the region of the fluidized bed portion which influences the contact reaction which occurs within the vessel, with the best accuracy.

It is important in the fluidized-bed equipment to adjust or regulate a supply quantity of fuel and a supply quantity of the gasification agent, on the basis of the bed height of the fluidized-bed portion. For this purpose, it is desired that an operator who operates the fluidized-bed equipment sees by his eyes so as to be capable of confirming the bed height of the fluidized bed portion. Means is provided for displaying the physical-property distribution curves of the respective two divided regions within the vessel, whereby it is possible that the operator who operates the fluidized-bed equipment sees by his eyes to confirm the bed height of the fluidized bed.

DETAILED DESCRIPTION OF THE PREFERRED EMBODIMENTS

Figure 3:
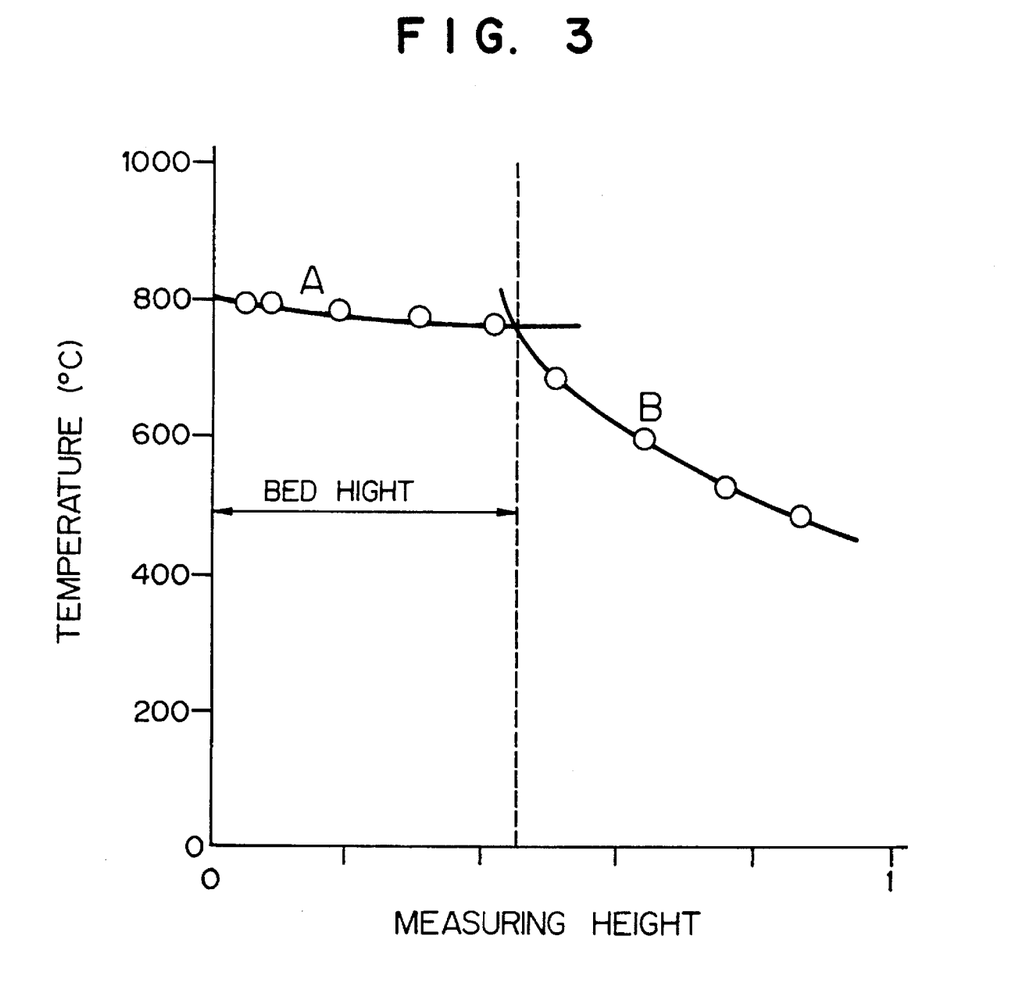
FIG. 3 is a view of a temperature distribution curve showing a relationship between a fluidized bed portion within a vessel and a bed height and temperature of a gas portion.

A method of detecting a bed height by temperature is shown in FIG. 3. Heat transfer conditions are different from each other in a region (lower bed portion) $\underline{A}$ and a region (upper bed portion) $\underline{B}$ that is one of two upper and lower regions into which an interior of a vessel for containing a fluidized particle is optionally divided and, accordingly, are brought respectively to curves different from each other. Thus, an intersection between the curves represents a boundary between the region $\underline{A}$ and the region $\underline{B}$. In the region $\underline{A}$, reaction occurs so that heat generation occurs. Since the particle is violently fluidized, the heat transfer condition is made superior. Accordingly, a change or variation in temperature with respect to a measured height thereof is small. In the region $\underline{B}$ of the upper bed portion, there exists no particle, and there is no reaction. Accordingly, heat transfer is deteriorated therein, and a change in temperature within the vessel is made large in a height direction.

Figure 4:
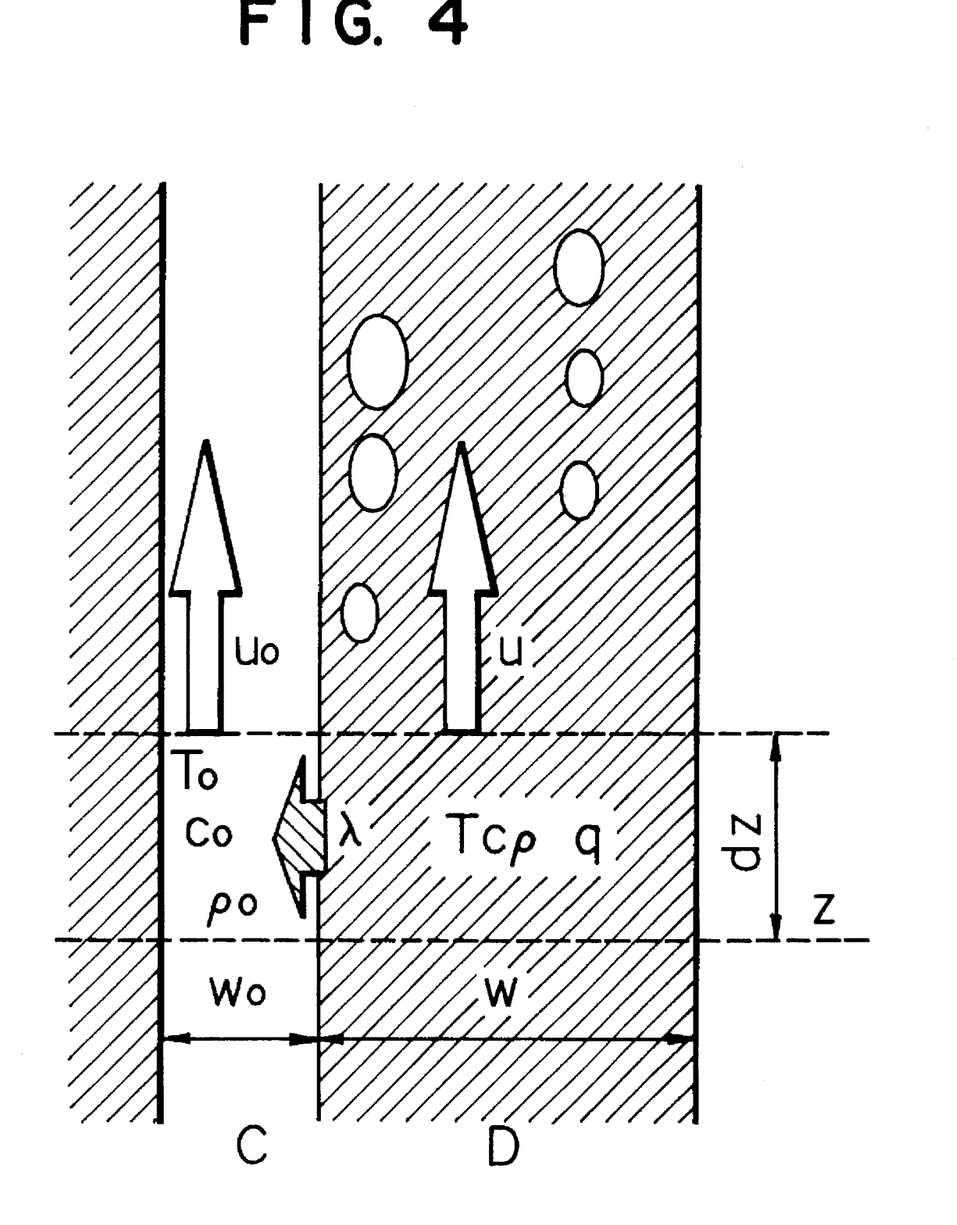
FIG. 4 is a view for description showing the modeling of the fluidized bed portion within the vessel.

The heat transfer state or condition within the region A is modeled as shown in FIG. 4. The reference character C denotes an interior of the heat transfer tube, while the reference character D denotes an interior of the fluidized bed portion. An approximate curve indicating a temperature distribution within the heat transfer tube can be found as follows on the basis of heat balance in a minute region $d_z$. Here, the reference character "0" denotes a constant of the heat transfer tube C within the bed. Heat generation within the fluidized bed portion is supposed to occur at a lower portion of the heat transfer tube, and is not considered here.

$$\frac{dT}{dz} = \alpha(T_o - T) \quad (\alpha = \lambda/cu\rho w) \quad \text{(equation 1)}$$

$$\frac{dT_o}{dz} = \alpha_o(T - T_o) \quad (\alpha_o = \lambda/c_o u_o \rho_o w_o) \quad \text{(equation 2)}$$

$$\frac{d}{dz}\left(\frac{dt}{dz} + (\alpha_o + \alpha)t\right) = 0 \quad \text{(equation 3)}$$

$$T = a + b \exp(-(\alpha_o + \alpha)z) \quad \text{(equation 4)}$$

Here,

T: temperature
λ: thermal conductivity
c: specific heat
u: ascent velocity or rate
ρ: density
w: its width, and
a, b: proportional constant A curve is applied to the equation (4) so as to find an intersection. Because of the curve being nonlinear, a coefficient $a$ is supposed, a logarithm is taken, a curve is applied by a least square method, and the coefficient $a$ by which an error is minimized is found by a generally known-well complex method.

An algorithm of computation of a bed height will now be described hereinafter. First, it is supposed that an intermediate portion of an optional temperature measuring point is a boundary between the fluidized-bed portion and the free board portion (gas portion). Curves are applied in every discrete or separated regions so as to compute an error. The above-described operation is effected with regard to the intermediate portion of all of the temperature measurement points. An intersection of the approximate curves is found by a combination in which the error is minimized to compute the bed height.

According to the invention, it is possible to find the bed height of the fluidized-bed portion of the fluidized-bed equipment quickly and accurately, to adequately take measures against the same. Further, according to the invention, the aforesaid expression for fitting of the temperature distribution is analyzed whereby it is made possible to estimate fluidized behavior of the pulverized fuel within the vessel which has conventionally been handled as a black box. Specifically, α is found by the aforementioned equations 1–4. If γ, c, ρ, and w at each condition is substituted into the equations, a speed or rate $u$ of a bed material (fluidized particle) of the fluidized-bed portion is found so as to compute a particle ascending rate.

Figure 1:
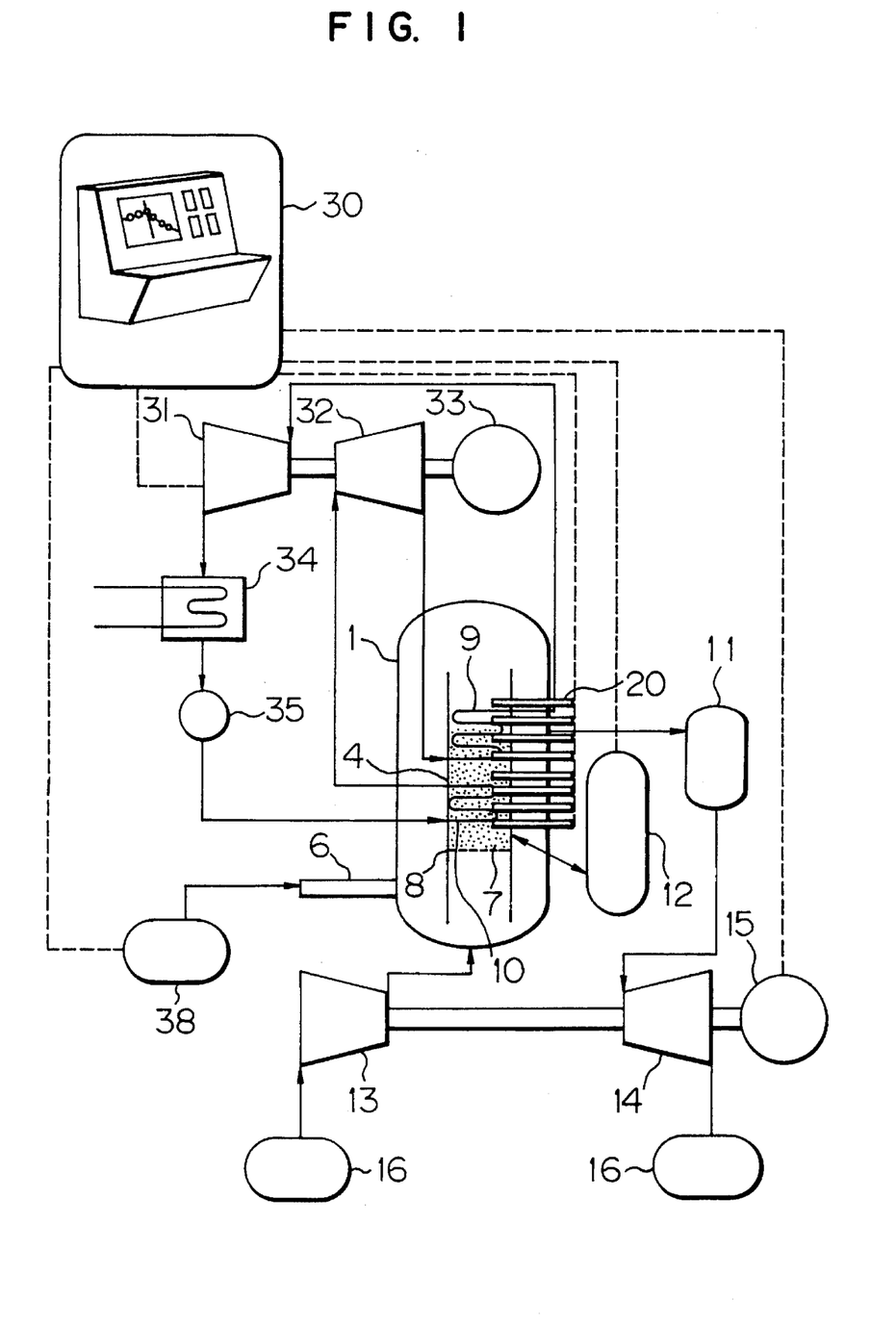
FIG. 1 is an entire view showing a pressurized fluidized-bed (combustion) combined cycle system according to an embodiment of the invention.
Figure 2:
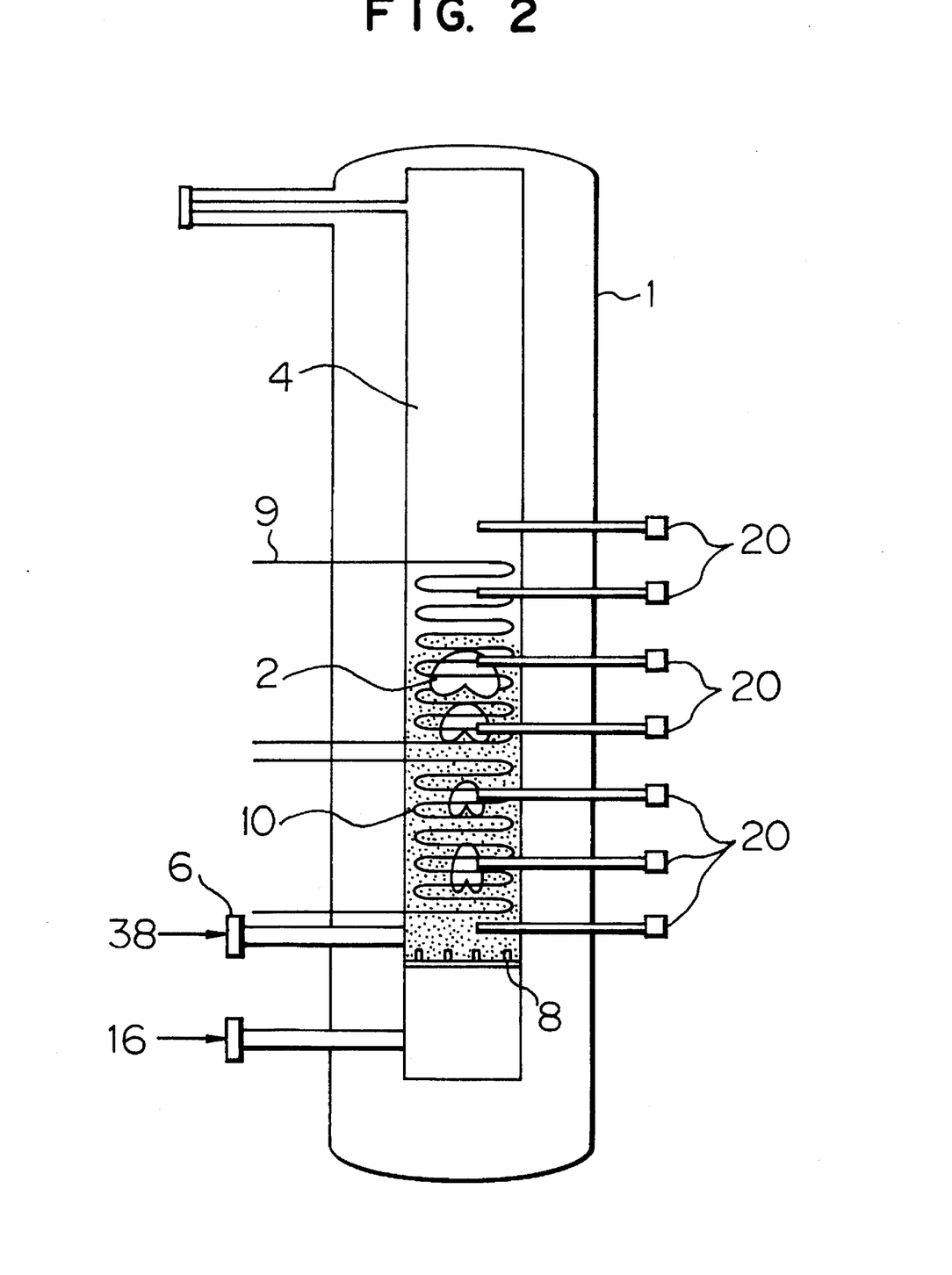
FIG. 2 is a detailed view showing a vessel in the system illustrated in FIG. 1.

A specific embodiment of the combined cycle system provided with the pressurized fluidized-bed equipment according to the invention will be described with reference to FIGS. 1 and 2.

The system comprises, as a whole, a pressurized fluidized-bed coal combustor, a gas-turbine cycle equipment, a steam turbine cycle equipment, and a controller. In the pressurized fluidized-bed coal combustor, coal 38 is supplied to a fluidized bed 4 of a vessel 1 through a nozzle 6. Air 16 in the atmosphere is pressurized by an air compressor 13. The air 16 is mixed with the generated high-pressure air 16 within the bed, and the coal 38 is burned therein. A fluidized particle 7 is placed on a network plate 8. Combustion exhaust gas is supplied to a gas turbine 14 through a dust separator 11. Power generated at the gas turbine 14 is transmitted to the air compressor 13 and a gas-turbine generator 15. A bed height of the fluidized bed 4 is determined by filler movement between an auxiliary vessel 12 and the fluidized bed 4.

In the steam turbine cycle equipment, steam is cooled by a condenser 34 and is brought to water. The water is pressurized by a feed water pump 35. The pressurized water enters a superheater 10 and is brought to steam, and enters a high-pressure turbine 32. The steam gotten out of the high-pressure turbine 32 is further heated by a reheater 9, and enters a low-pressure turbine 31. Power generated by the low-pressure turbine 31 and the high-pressure turbine 32 is transmitted to a steam-turbine generator 33, and is converted to electricity. A controller 30 controls the above-described equipments synthetically. The controller 30 is provided with display means for displaying physical-property distribution curves of respective two-divided regions of the fluidized bed.

Operation of the invention will next be described. In the pressurized fluidized-bed (combustion) combined cycle system, sulfur oxides (SOx) and nitrogen oxides (NOx) are absorbed and canceled within the vessel containing the fluidized particle. For this reason, the fluidized particle contains solvent such as lime or dolomite. The temperature within the vessel is required to be maintained to the most adequate temperature with respect to reaction removing the sulfur oxides and the nitrogen oxides.

In a case where the pressurized fluidized-bed combined cycle system is operated or run under a predetermined load, control is effected in which temperature is made constant by variation or change in a quantity of fluidized particle that is a filler within the pressure vessel, that is, a bed height. The pressure vessel 1 is provided with the high-temperature heat exchanger 9 and the low-temperature heat exchanger 10 for transferring heat to a location out of the system. A heat-exchanging surface area of the heat transfer tube within the fluidized bed 4 of these heat exchangers is changed by changing of the bed height. By doing so, an absorbing quantity of heat generated at the pressure vessel is changed, and the temperature of the interior of the vessel is changed. In a case where the temperature is higher than a set-up temperature, the bed height of the fluidized bed is raised to increase the absorption quantity of heat. While, in a case where the temperature is lower than the set-up temperature, the bed height is reduced to reduce the absorption quantity of heat, so that the temperature within the vessel is maintained constant.

The temperature within the vessel 1 is detected by a temperature detecting device 20. Results of detecting the temperature are shown in FIG. 3. Since heat transfer conditions are different from each other in the region A and the region B, curves different from each other are obtained from the conditions. Accordingly, an intersection of the curves indicates a boundary between the fluidized bed and the gas portion.

The heat transfer condition or state within the vessel is modeled as shown in FIG. 4. An approximate expression for showing a temperature distribution within the heat transfer tube from heat balance in the minute region dz is indicated in the equation 4.

The curve is applied to the equation 4 to find the intersection. Because of non-linearity, a coefficient $\underline{a}$ is supposed, a logarithm is taken, a curve is applied by a least square method thereto, and the coefficient $\underline{a}$ in which the error is minimized is found by a well-known complex method.

An algorithm of computation of the bed height is such that an intermediate portion between optional temperature measurement points is first supposed to a boundary between the fluidized beds, and curves are applied every separated regions so as to compute an error. The above-described operation is effected with regard to an intermediate portion between all of the temperature measurement points. An intersection between approximate curves is found on the basis of a combination in which the error is minimized, so that the height is computed.

Figure 6:
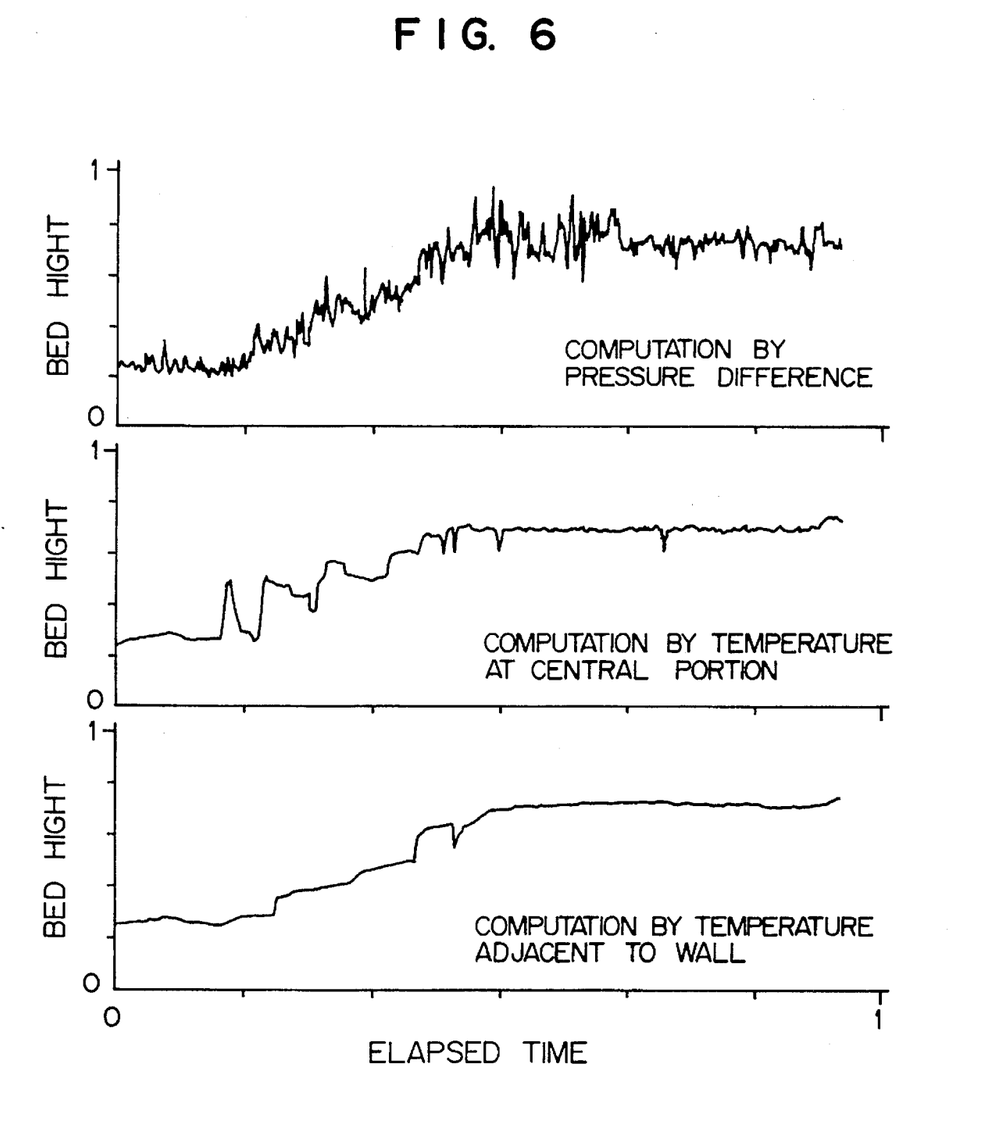
FIG. 6 is a curve view showing computation results of the bed height of the fluidized bed in comparison with that of a conventional method.

FIG. 6 shows a deterioration with age of the bed height of the fluidized bed computed by various systems. The bed height computed by the temperature is extremely high in stability as compared with the bed height computed by the pressure difference. Further, the response is also equivalent to or equal to that found by the pressure difference. Moreover, the bed height found adjacent to the wall within the vessel is particularly high in stability upon load change, as compared with the bed height found by the temperature at the central portion within the vessel. This is because the bed height is difficult to be influenced by a bubble 2 in the vicinity of the wall.

Figure 7:
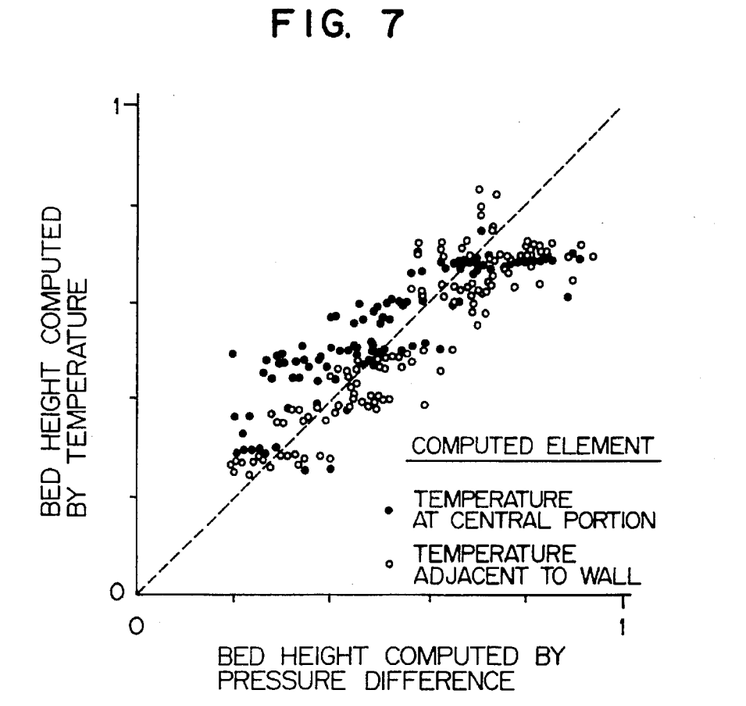
FIG. 7 is a correlation view between the bed height of the fluidized bed computed by temperature and the bed height computed by a pressure difference.

FIG. 7 shows the bed height computed by the pressure difference and the bed height computed by the temperature in comparison with each other. In both the bed heights, they have a strong correlation, and it is suggested that a bed-height computing method due to the temperature is appropriate or proper.

Figure 5:
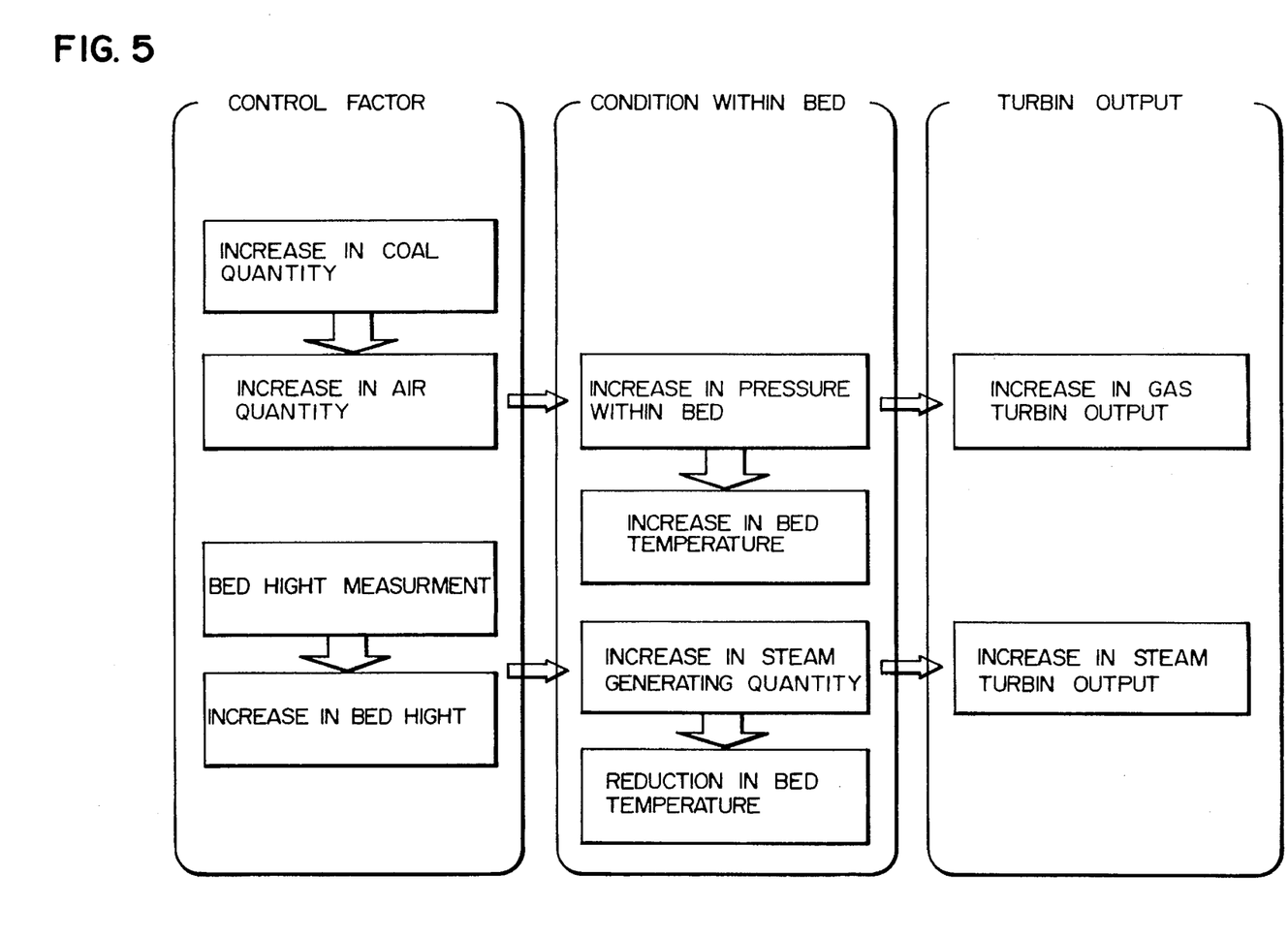
FIG. 5 is a control flow chart of the system illustrated in FIG 1.
Figure 8:
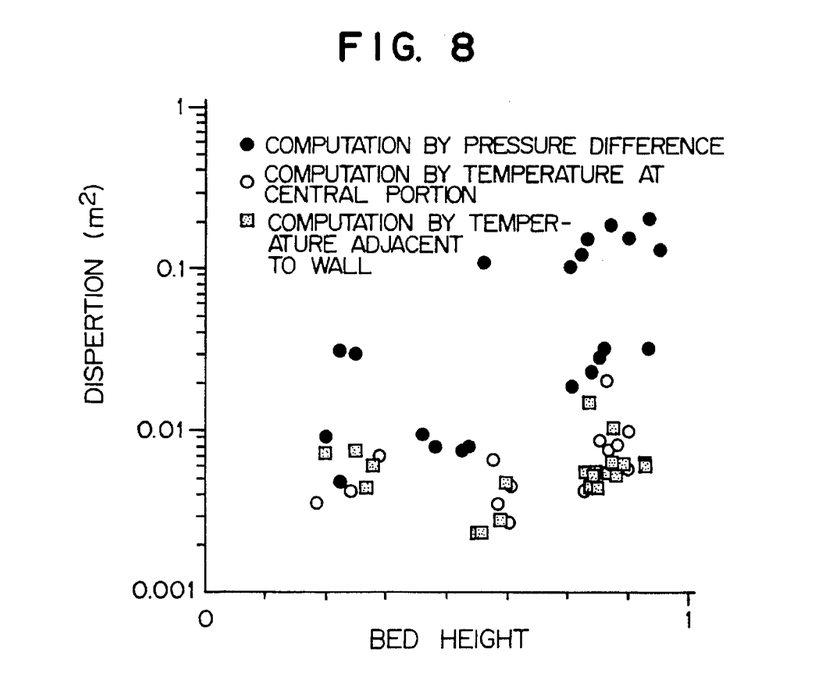
FIG. 8 is a view showing dispersion of the computed values of the bed height computed by the pressure difference and the bed height computed by the temperature.

FIG. 8 shows dispersion of the bed-height computing values in various heights. The bed height computed by the temperature is less in distribution, and it has been confirmable that the bed height is adequate as a controlled object. FIG. 5 shows a flow which controls the fluidized-bed equipment by the invention. Among control factors, the bed height is measured by the temperature, and an increase in a generating quantity of steam and pressure within the vessel is attempted in accordance with a load command. By doing so, a load change higher in speed or rate is made possible therein.

Detection of the bed height of the fluidized bed within the vessel is extremely important because the physical property indicating the bed height influences a running state or condition of the fluidized-bed equipment. For example, in a case where the height of the bed of the fluidized particle expresses a processing or treatment quantity of the reactor, only a portion in which reaction sufficiently proceeds should be brought to a bed height. Particularly, in a fluidized equipment that is a contact reaction apparatus between gas and fine particle, clear distinction of the bed is made difficult. In a case where a boundary is found by a conventional pressure difference, a portion thick in concentration of the particle is judged as being a bed, while a portion thin in concentration of the particle is judged as being a gas portion. However, the heat transfer condition is not governed or controlled by the bed height. Basically or fundamentally, in a case where the particle concentration is thick, the heat transfer condition is good or superior, while in a case of a thin condition, the heat transfer condition is deteriorated. However, in a boundary region in which the density of the particle proceeds from a thick portion to a thin portion, even if the particle concentration becomes thin, the heat transfer condition at this portion becomes superior because the fluidized condition is violated. Accordingly, by the bed height found by the pressure, a portion indicating this approximate condition cannot be detected, and it is impossible to give information of the boundary required for heat transfer. Since the change in load of the pressurized fluidized-bed equipment is controlled by the bed height of the fluidized bed which is determined by the heat transfer condition, the bed height found by the pressure difference becomes lower than the bed height found by the heat transfer. Thus, superior control of the bed height cannot be effected.

According to the invention, it is possible to accurately give information of the boundary required for the heat transfer within the vessel containing the fluidized particle. Further, since the heat transfer condition within the vessel can be predicted, prediction of the operational quantity required for the load change is made possible, and it is possible to quickly control the bed height.

As described above, according to the invention, it is possible to compute the bed height of the fluidized bed which influences the reaction of the fluidized-bed equipment. The quantity of operation of the factor which influences the reaction is determined on the basis of the bed height found in this manner, whereby it is possible to effect the control high in reliability.

What is claimed is:

1. A system for determining bed height in a fluidized-bed equipment comprising: a vessel having a first region high in concentration of a granular or liquid substance and a second region low in said concentration, surface detecting means for determining a bed height by selecting, in an interior of said vessel, two upper and lower optional regions and producing an expression for fitting expressing a physical property distribution, from physical property measuring values within said regions, to find an intersection, repeating determining an intersection with different selected divided regions, and determining a bed height corresponding to an intersection in which a correlation between a measuring value and an expression for fitting is the most superior.

2. A system for determining bed height in a fluidized-bed equipment comprising: a vessel having a first region high in concentration of a granular or liquid substance and a second region low in said concentration, means for measuring a physical property within said vessel, means for selecting, an interior of said vessel, two upper and lower optional regions and producing two expressions for fitting expressing physical property distributions in the respective regions, as a single exponential function, from physical property measuring values of the respective regions, to find an intersection between the two expressions, repeating producing of the two expressions and finding of an intersection in different selected regions, and determining a bed height corresponding to an intersection in which a correlation between a measuring value and the expressions for fitting is the best, and display means for displaying the physical property distributions produced from the two expressions for fitting in the selected combination.

3. A system for determining bed height in a fluidized-bed equipment according to claim 2, wherein said means for measuring finds the expressions for fitting in order to find a physical property distribution curve or a function expressing the physical property distribution.

4. A system for determining bed height in a fluidized-bed equipment according to claim 2, wherein said means for measuring finds the expressions for fitting in order to find a physical property distribution by utilizing physical property measuring values except for physical property measuring values of two positions the closest to each other in the two selected divided regions.

5. A system for determining bed height in a pressurized fluidized-bed equipment comprising: a pressure vessel filled with fluidized particles, means for supplying coal particles into said vessel, means for supplying a gasification agent of the coal particles, means for exhausting gas of formation generated by gasification of said coal out of said vessel, and surface detecting means for measuring physical properties at a plurality of points within said vessel in a height direction thereof, to find the expressions for fitting of physical property distribution curves of two selected optionally divided upper and lower regions of said vessel, repeating finding of the expressions for fitting with different selected regions to detect a bed height of the fluidized particles corresponding to an intersection of two expressions for fitting in which a correlation between physical property measuring values and the expression for fitting is the best.

6. A system for regulating a fluidized-bed boiler comprising: a vessel into which a fluidized particle is put, means supplying coal particles into said vessel, means for supplying a gasification agent of said coal particles, means for exhausting combustion gas produced by gasification of the coal particles, from said vessel, heat-exchanging means arranged within said vessel for being heated by heat of combustion of the coal particles to produce steam from water, means for measuring physical properties at a plurality of points within said vessel in a height direction thereof, means for selecting an interior of said vessel, two optional upper and lower regions to find physical property distribution curves of the respective selected regions from said physical property measuring results to display the physical property distribution curves, and means for regulating at least one of fuel supply quantity, gasification agent supply quantity, and quantity of water supplied to said heat exchanging means, on the basis of an intersection of two produced physical property distribution curves.

7. A system for regulating a pressurized fluidized-bed combined cycle apparatus comprising: a pressure vessel provided with a heat exchanger filled with fluidized particles for producing steam from water, a gas turbine driven by power which is gas generated by supply of coal particles and a gasification agent of the coal particles to said vessel, a steam turbine driven by steam produced by said heat exchanger, one generator for generating electric power by the power of said gas turbine, another generator for generating electric power by the power of said steam turbine, means for measuring physical properties at a plurality of points within said vessel in a height direction thereof, to find an intersection of respective physical property distributions of the selected optionally divided upper and lower regions, and means for regulating at least one parameter selected from the group consisting of a quantity of coal particles supplied into said vessel on the basis of the produced intersection, a flow rate of the gasification agent and a quantity of water supplied to said heat exchanger.

* * * * *